US008993890B2

(12) United States Patent
Sato et al.

(10) Patent No.: US 8,993,890 B2
(45) Date of Patent: Mar. 31, 2015

(54) ELECTRIC CABLE AND ELECTRIC CONNECTOR

(75) Inventors: Toshio Sato, Miyoshi (JP); Sho Miyazaki, Yokkaichi (JP)

(73) Assignees: Toyota Jidosha Kabushiki Kaisha, Aichi-ken (JP); Sumitomo Wiring Sytems, Ltd., Mei (JP)

( * ) Notice: Subject to any disclaimer, the term of this patent is extended or adjusted under 35 U.S.C. 154(b) by 225 days.

(21) Appl. No.: 13/697,140

(22) PCT Filed: May 10, 2011

(86) PCT No.: PCT/IB2011/000981
§ 371 (c)(1),
(2), (4) Date: Nov. 9, 2012

(87) PCT Pub. No.: WO2011/141792
PCT Pub. Date: Nov. 17, 2011

(65) Prior Publication Data

US 2013/0068523 A1 Mar. 21, 2013

(30) Foreign Application Priority Data

May 12, 2010 (JP) ................................ 2010-109991

(51) Int. Cl.
*H01R 9/11* (2006.01)
*H01R 4/18* (2006.01)
(Continued)

(52) U.S. Cl.
CPC ................ *H01R 4/184* (2013.01); *H01R 4/182* (2013.01); *H01R 13/56* (2013.01); *H01R 43/16* (2013.01)
USPC ....... 174/113 R; 439/752; 439/877; 439/585; 439/736; 439/275

(58) Field of Classification Search
CPC ........... H01R 4/10; H01R 4/182; H01R 9/03; H01R 9/07; B60R 16/02
USPC ................... 174/113 R, 129, 42, 18.1, 128.1; 439/585, 877
See application file for complete search history.

(56) References Cited

U.S. PATENT DOCUMENTS 5,295,845 A * 3/1994 Changxing .................. 439/173
6,974,344 B2 * 12/2005 Comerci ...................... 439/329
(Continued)

FOREIGN PATENT DOCUMENTS

DE 882872 C 7/1953
DE 2052465 * 5/1972
(Continued)

OTHER PUBLICATIONS

International Search Report issued in PCT/IB2001/000981, mailed Nov. 21, 2011.

*Primary Examiner* — Timothy Thompson
*Assistant Examiner* — Michael F McAllister
(74) *Attorney, Agent, or Firm* — Sughrue Mion, PLLC

(57) ABSTRACT

An electric cable includes: a flat electric wire that is hard to bend in a longitudinal direction and easy to bend in a lateral direction; and a terminal that is coupled to a terminal end of the flat electric wire and connected to an inverter. The terminal has a wire connection portion coupled to the terminal end of the flat electric wire and a connecting portion connected to the inverter. The terminal is formed so that, when the terminal is connected to the inverter, a plane that includes a flat surface of the connecting portion is oriented in the direction in which the flat electric wire is easy to bend and intersects with the predetermined direction.

11 Claims, 9 Drawing Sheets

(51) Int. Cl.

| | |
|---|---|
| ***H01R 13/56*** | (2006.01) |
| ***H01R 43/16*** | (2006.01) |
| *H01R 13/514* | (2006.01) |
| *H02G 3/04* | (2006.01) |

(56) References Cited

U.S. PATENT DOCUMENTS

| | | | | |
|---|---|---|---|---|
| 7,059,918 | B2 * | 6/2006 | Matsumoto et al. | 439/752 |
| 7,530,843 | B1 | 5/2009 | Tesfay et al. | |
| 7,533,461 | B2 | 5/2009 | Griffiths | |
| 8,764,475 | B2 * | 7/2014 | Maher et al. | 439/391 |
| 2003/0114042 | A1 * | 6/2003 | Mortun et al. | 439/449 |
| 2005/0255755 | A1 * | 11/2005 | Mott | 439/736 |
| 2009/0258521 | A1 * | 10/2009 | Ooki | 439/275 |

FOREIGN PATENT DOCUMENTS

| | | | |
|---|---|---|---|
| DE | 2052465 | A1 | 5/1972 |
| JP | 02-288108 | A | 11/1990 |
| JP | 11-185841 | A | 7/1999 |
| JP | 2002-111606 | A | 4/2002 |
| JP | 2003-308738 | A | 10/2003 |
| JP | 2007-227257 | A | 9/2007 |
| WO | 2005/038190 | A1 | 4/2005 |

* cited by examiner

ELECTRIC CABLE AND ELECTRIC CONNECTOR

The disclosure of Japanese Patent Application No. 2010-109991 filed on May 12, 2010, including the specification, drawings and abstract is incorporated herein by reference in its entirety.

BACKGROUND OF THE INVENTION

1. Field of the Invention

The invention relates to an electric cable and an electric connector and, more particularly, to an electric cable and an electric connector that are suitably used for an electrical connection in a limited wiring space.

2. Description of Related Art

There is known an existing hybrid vehicle that is equipped with an engine and a motor as a driving power source. Such a hybrid vehicle is, for example, equipped with a battery, such as a nickel metal hydride battery and a lithium ion battery. The hybrid vehicle converts direct-current voltage supplied from the battery to alternating-current voltage by an inverter and then applies the alternating-current voltage to the motor. By so doing, the hybrid vehicle is able to drive the motor for rotation to output driving power.

In the above hybrid vehicle, the inverter may be arranged in an engine compartment together with a drive unit that integrates the engine and the motor. The inverter and the motor are electrically connected to each other by electric cables. The drive unit mostly occupies a large volume in the engine compartment. Accordingly, the installation space of the inverter and the wiring space required to arrange the electric cables from the inverter to the motor may be extremely limited. Therefore, depending on the positional relationship between the inverter and the motor, more specifically, the relationship in position and orientation between the output terminals of the inverter, to which one ends of the electric cables are connected, and the input terminals of the motor, to which the other ends of the electric cables are connected, the electric cables might need to be arranged so as to be curved in an extremely narrow space.

Here, a related art document, for example, Japanese Patent Application Publication No. 2003-308738 (JP-A-2003-308738), describes an automobile wire harness. In this automobile wire harness, three electric wires are tied together by tape until a branch location, the three electric wires are separated into a set of two electric wires and a single wire and branched into two directions from the branch location, the terminal of the set of two electric wires is crimped with a single L-shaped terminal, a single L-shaped terminal is crimped with the terminal of the single electric wire, and the three electric wires are tied together by tape until the branch location to achieve branch direction control by which the two branch directions are along both right and left outer surfaces of an electric connection box and terminal direction control by which horizontal protruding portions of the two L-shaped terminals, each having a bolt hole, are located to face each other to thereby prevent the directions of the electric wires and L-shaped terminals of the wire harness branched into two directions from erroneously changing.

Incidentally, in a hybrid vehicle, mostly round electric wires are used for electric cables that connect an inverter to a motor. Each round electric wire has a copper wire and an insulating sheath material that covers the copper wire, and the copper wire and insulating sheath material have a circular cross-sectional shape. In contrast to this, a flat electric wire that has, for example, an oblong or elliptical cross-sectional shape has a larger surface area of an insulating sheath material that covers a copper wire than a round electric wire, so the flat electric wire has a relatively high heat dissipation characteristic during energization and is advantageous for suppressing a power loss due to a copper loss.

However, because the flat electric wire has a flattened cross-sectional shape having a longitudinal direction and a lateral direction, the flat electric wire is easy to bend in the lateral direction but the flat electric wire is hard to bend in the longitudinal direction. Therefore, when a flat electric wire is used for each of electric cables that connect an inverter to a motor in a hybrid vehicle, there is a problem that the flat electric wire can need to be curved in the direction in which the flat electric wire is hard to bend depending on the relationship in location, orientation, and the like, between the inverter and the motor and, therefore, the wiring space required for curving the flat electric wire increases.

Against the above problem, the automobile wire harness described in JP-A-2003-308738 is formed of three round electric wires and then prevents the directions of the set of two electric wires and single electric wire of the wire harness that are branched into two directions and the directions of the L-shaped terminals respectively crimped with the terminals of the branched set of two electric wires and single electric wire from erroneously changing. The automobile wire harness described in JP-A-2003-308738 does not provide a solution for the increased wiring space of the flat electric wire as described above.

SUMMARY OF THE INVENTION

The invention provides an electric cable that includes an electric wire that is hard to bend in a predetermined direction and easy to bend in a direction different from the predetermined direction and a terminal that is coupled to a terminal end of the electric wire and connected to an electrical apparatus, and that is able to reduce wiring space in such a manner that the easy bending direction is brought into coincidence or substantially coincidence with a bending direction in which the electric cable needs to be bent for a desired wiring direction, and also provides an electric connector that uses the electric cable.

An aspect of the invention provides an electric cable. The electric cable includes an electric wire that is hard to bend in a predetermined direction and easy to bend in a direction different from the predetermined direction and a terminal that is coupled to a terminal end of the electric wire and connected to an electrical apparatus. The terminal has a wire connection portion coupled to the terminal end of the electric wire and a connecting portion connected to the electrical apparatus, and is formed so that, when the terminal is connected to the electrical apparatus, a plane that includes a flat surface of the connecting portion is oriented in the direction in which the electric wire is easy to bend and intersects with the predetermined direction.

In the electric cable according to the aspect of the invention, the terminal may be formed of a metal plate and may be formed so that the connecting portion is bent with respect to the wire connection portion.

In addition, in the electric cable according to the aspect of the invention, the terminal may be formed of a metal plate and may be formed so that the connecting portion is twisted with respect to the wire connection portion.

In addition, in the electric cable according to the aspect of the invention, the electric wire may be a flat electric wire that has a flattened cross-sectional shape having a longitudinal direction and a lateral direction perpendicular to the longitudinal direction.

Furthermore, in the electric cable according to the aspect of the invention, the terminal may be formed so that the plane that includes the flat surface of the connecting portion is perpendicular to the predetermined direction in which the electric wire is hard to bend.

Another aspect of the invention provides an electric connector. The electric connector includes: a plurality of the electric cables that have any one of the structures described above and that are provided side by side; a connector housing that accommodates the wire connection portions of the terminals of the respective electric cables and parts of the connecting portions of the terminals of the respective electric cables and that allows distal end portions of the connecting portions of the terminals to protrude outward of the connector housing; and a seal member that is provided around end portions of the electric wires inside the connector housing and that keeps the inside of the connector housing in a fluid-tight state.

The above electric connector may include the three electric cables corresponding to three U, V and W phases, and the terminals of the electric cables may be respectively connected to output terminals of an inverter that serves as the electrical apparatus.

In addition, in the above electric connector, an angle, at which the plane that includes the flat surface of the connecting portion of the terminal of at least one of the three electric cables intersects with the predetermined direction in which the electric wire is hard to bend, may be varied from those of the other electric cables.

Furthermore, in the above electric connector, an angle, at which the plane that includes the flat surface of the connecting portion of the terminal of each of the three electric cables intersects with the predetermined direction in which the electric wire is hard to bend, may be varied among the three electric cables.

In the electric cable and the electric connector according to the aspects of the invention, the terminal is coupled to the terminal end of the electric wire, which is hard to bend in the predetermined direction and easy to bend in the direction different from the predetermined direction, and connected to the electrical apparatus, the terminal has the wire connection portion coupled to the terminal end of the electric wire and the connecting portion connected to the electrical apparatus, and the terminal is formed so that, when the terminal is connected to the electrical apparatus, the plane that includes the flat surface of the connecting portion is oriented in the direction in which the electric wire is easy to bend. By so doing, the direction in which the electric cable connected to the electrical apparatus by the terminal is easy to bend may be brought into coincidence or substantially coincidence with a bending direction in which the electric cable needs to be bent for a desired wiring direction. As a result, it is possible to reduce wiring space.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. In this description, specific shapes, materials, numeric values, directions, and the like, are only illustrative for easily understanding the aspect of the invention and may be modified appropriately to meet an application purpose, an object, specifications, and the like.

Figure 1:
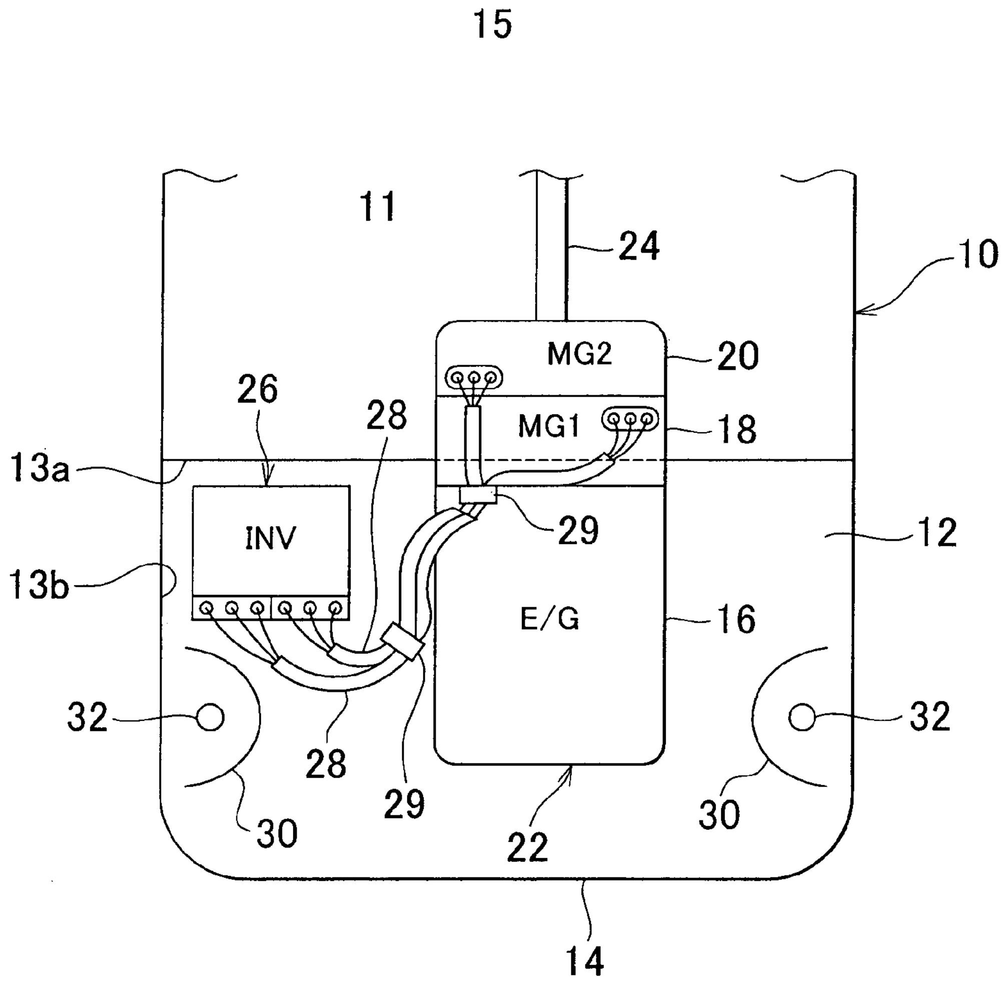
FIG. 1 is a schematic configuration diagram of the vehicle front portion of a hybrid vehicle in which electric cables and electric connectors according to an embodiment of the invention are used.

FIG. 1 schematically shows the inside of an engine compartment 12 of a front-engine rear-drive (FR) hybrid vehicle 10 when viewed from above. The hybrid vehicle 10 has the engine compartment 12 inside the body of a vehicle front 14. A drive unit 22 is longitudinally mounted in the engine compartment 12. The drive unit 22 is an integrated unit of an engine (E/G) 16 and two motors (MG1 and MG2) 18 and 20. A drive shaft 24 extends from the drive unit 22 toward a vehicle rear 15.

The engine 16 is an internal combustion engine that is able to output power for propelling the vehicle and/or power for generating electric power using fuel, such as gasoline and light oil. For example, a three-phase alternating-current motor is suitably used for the motors 18 and 20. The motors 18 and 20 each are able to function as both an electric motor and a generator. That is, the motors 18 and 20 each are driven for rotation with three-phase alternating-current voltages generated from direct-current voltage supplied from an in-vehicle battery (not shown) to be able to output driving power, while generating electric power with power transmitted from wheels during regeneration to be able to charge the battery with the generated electric power. In addition, when the state of charge of the battery is low, the motor 18, for example, receives engine power to generate electric power, and then the battery is charged with the generated electric power. Furthermore, the motor 18 also functions as a starter motor that is driven with electric power from the battery to crank the engine 16 when the engine 16 is started.

Note that a secondary battery, such as a nickel metal hydride battery and a lithium ion battery, is suitably used for the battery, and may be mounted at the vehicle rear 15. In addition, another electrical storage device, such as an electric double layer capacitor, may be, for example, used as an electrical storage device instead of the battery.

In the hybrid vehicle 10, the motors 18 and 20 each are electrically connected to an inverter (INV) 26 via electric cables 28. The inverter 26 includes an MG1 inverter circuit and an MG2 inverter circuit. The inverter 26 converts direct-current voltage supplied from the battery to, for example, three-phase alternating-current voltages and then applies the three-phase alternating-current voltages to each of the motors 18 and 20. By so doing, the motors 18 and 20 are driven for rotation.

Suspension towers 30 are respectively formed on both right and left wall surfaces of the engine compartment 12. Each suspension tower 30 is formed so that the vehicle body is swelled toward the inside of the engine compartment 12 so as to form a mounting space of a front wheel suspension portion on an outer side of the vehicle body. Each suspension tower 30 has an opening 32 at its upper portion. The opening 32 is usually closed by a cap member. The front wheel suspension portion may be assembled or adjusted through the opening 32.

The drive unit 22 is arranged substantially at the center in the engine compartment 12, and occupies a large volume in the engine compartment 12. In addition, in the example shown in FIG. 1, the engine 16 of the drive unit 22 is located substantially at the center in the engine compartment 12, and the motors 18 and 20 coupled to the engine 16 are provided at the lower side in the engine compartment 12 at a location that projects into a vehicle cabin 11.

The inverter 26 is mounted at a rear side location in the engine compartment 12. Therefore, in the example shown in FIG. 1, the inverter 26 is mounted on the left side (that is, the vehicle right side) of the drive unit 22 located at the center in a narrow space placed between an engine compartment rear wall surface 13*a* and the suspension tower 30 inside the engine compartment 12.

In addition, the inverter 26 includes output terminals 34 (see FIG. 2) for outputting alternating-current voltages converted from direct-current voltage. Each output terminal 34 is a portion to which an electric connector provided at the terminal ends of the electric cables 28 is connected. The rear side and vehicle right side (left side in FIG. 1) of the inverter 26 are respectively located in proximity to the rear wall surface 13*a* and right wall surface 13*b* of the engine compartment 12, and the drive unit 22 is located in proximity to the vehicle left side (right side in FIG. 1) of the inverter 26. Therefore, in order to easily connect and lead the electric cables 28 to the inverter 26, the inverter 26 is mounted so that the output terminals 34 are oriented toward the front of the vehicle.

Figure 2:
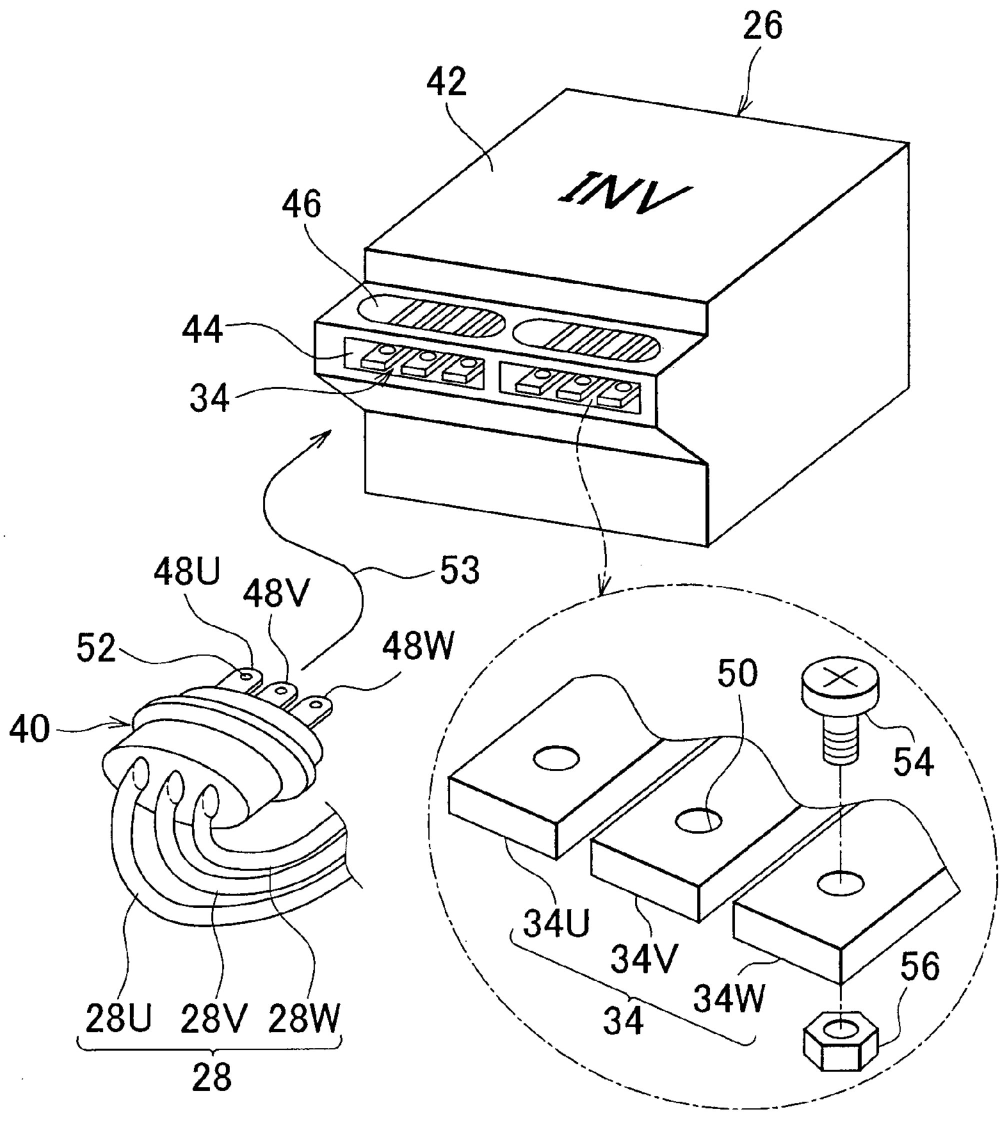
FIG. 2 is a view that shows the electric cables and the electric connector according to the embodiment and output terminal portions of an inverter to which the electric connector is connected.

FIG. 2 shows a perspective view of the inverter 26 and an electric connector 40 connected to the inverter 26 with an enlarged view of the output terminals 34 of the inverter 26. The inverter 26 is covered with an inverter case 42. The inverter case 42 has two front side openings 44 and two upper side openings 46 at its front portion. The two front side openings 44 are open forward. The two upper side openings 46 are open upward. The pairs of front side opening 44 and upper side opening 46 respectively correspond to the output terminals 34 of the MG1 inverter circuit and the output terminals 34 of the MG2 inverter circuit. In this example, the output terminals 34 at the left side in the drawing are electrically connected to the motor 18 via the electric cables 28, and the output terminals 34 at the right side in the drawing are electrically connected to the motor 20 via the other electric cables 28.

As shown in the enlarged view surrounded by the alternate long and short dashed line in FIG. 2, the output terminals 34 of the inverter 26 are formed so that three terminal strips 34U, 34V and 34W corresponding to the U, V and W phases of the motor 18 are arranged side by side. These terminal strips 34U, 34V and 34W are arranged in the inverter case 42 so as to be exposed through the front side opening 44 and the upper side opening 46. In addition, each of the terminal strips 34U, 34V and 34W has a mounting hole 50.

The electric cables 28 are also formed of three electric cables 28U, 28V and 28W corresponding to the U, V and W phases of the motor 18. The electric connector 40 is provided at the terminal ends of the three electric cables 28U, 28V and 28W. The distal end portions of terminals 48U, 48V and 48W of the respective phases protrude from the electric connector 40. The mounting hole 52 is formed at each of the distal end portions of the terminals 48U, 48V and 48W.

The thus configured electric connector 40 is inserted from the front side indicated by the arrow 53 into the front side opening 44 of the inverter 26, and the terminals 48U, 48V and 48W of the respective phases are placed on the terminal strips 34U, 34V and 34W of the respective phases in a state where the mounting holes 52 and 50 communicate with each other. Then, the terminals 48U, 48V and 48W of the respective phases are fixed to the terminal strips 34U, 34V and 34W of the respective phases by bolts 54 inserted from the upper side opening 46 into the pairs of mounting holes 50 and 52 and nuts 56 screwed to the bolts 54. By so doing, connecting the electric cables 28 to the inverter 26 is complete. Then, the upper side opening 46 of the inverter case 42 is closed by a cap member (not shown) to thereby prevent entry of water, or the like, into the inverter 26. In addition, the front side opening 44 of the inverter case 42 is sealed by the electric connector 40 in a fluid-tight manner as will be described later.

Note that, in order to easily connect the electric cables 28, the nuts 56 may be welded to the back surfaces of the respective terminal strips 34U, 34V and 34W or the mounting holes 50 of the respective terminal strips 34U, 34V and 34W may be formed as internal threaded holes to omit the nuts.

Figure 3:
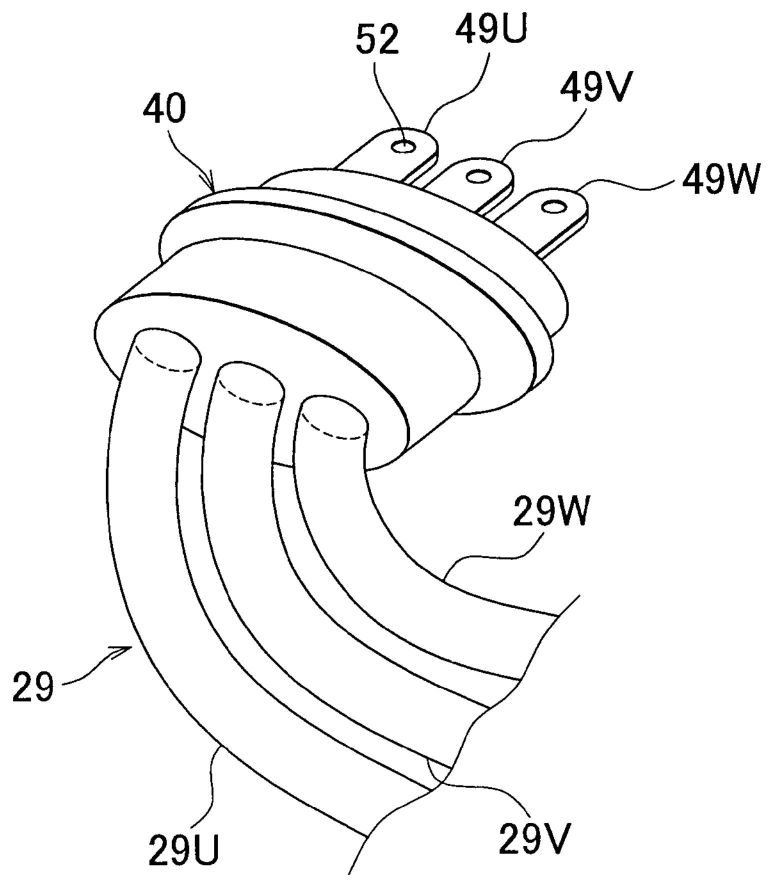
FIG. 3 PRIOR ART
FIG. 3 is a perspective view of an electric connector that includes flat electric wires to which existing general terminals are coupled.
Figure 4:
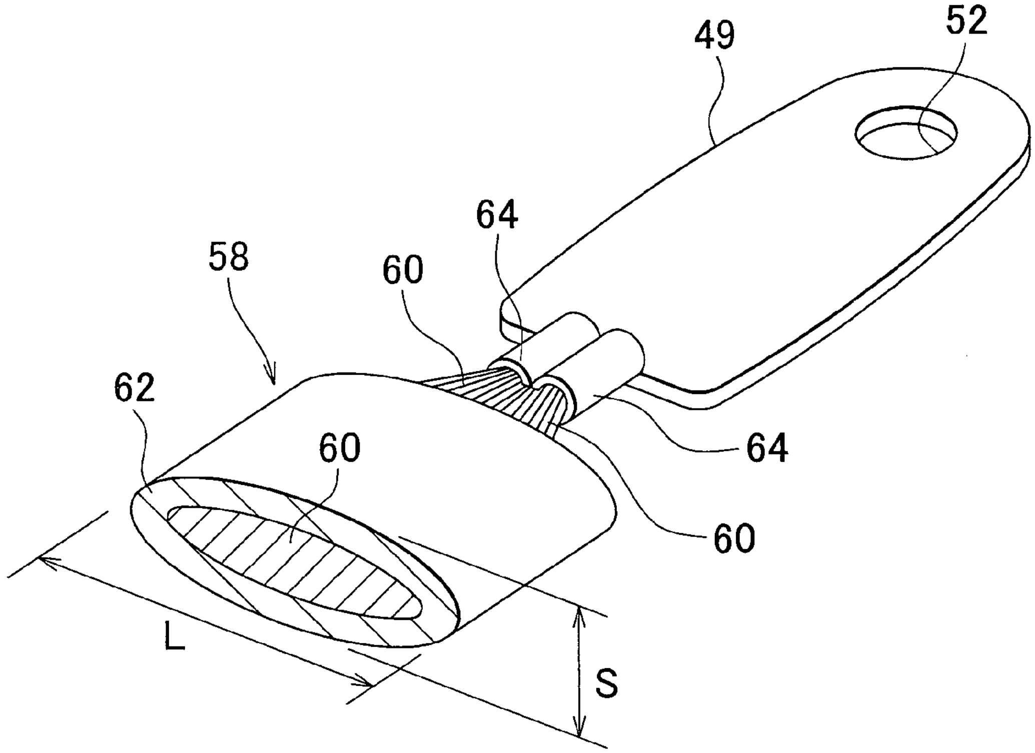
FIG. 4 PRIOR ART
FIG. 4 is an enlarged view of one of sets of the flat electric wire and the terminal that are included in the existing electric connector shown in FIG. 3.

FIG. 3 and FIG. 4 show an example of the case where electric cables 29 are formed of flat electric wires 58 each having a flattened cross-sectional shape and planar terminals 49 (terminals 49U, 49V and 49W of the respective phases may be collectively referred to by "49") each of which is made of a metal plate (for example, copper plate) connected to a corresponding one of the terminal ends of the flat electric wires 58. The electric connector 40 is provided at the terminal ends of the electric cables 29, and the distal end portions of the terminals 49U, 49V and 49W of the respective phases protrude from the electric connector 40, as in the case of the above described configuration.

The electric cables 28U, 28V and 28W are respectively formed of the flat electric wires 58 each having a flattened cross-sectional shape. Each of the above flat electric wires 58 has a copper wire portion and an insulating sheath material 62. The copper wire portion is formed so that a large number of narrow copper wires 60 are bundled to have a substantially oblong flattened cross-sectional shape or a substantially elliptical flattened cross-sectional shape. The insulating sheath material 62 covers the copper wire portion. The insulating sheath material 62 also has a substantially oblong flattened cross-sectional outer shape or a substantially elliptical flattened cross-sectional outer shape. Each of the flat electric wires 58 has a larger surface area of the insulating sheath material 62 than a round electric wire having an equivalent allowable current value, so the flat electric wire 58 has a relatively high heat dissipation characteristic during energization. Thus, even when the flat electric wire 58 has a relatively small copper wire cross-sectional area, a copper loss and heat generation when the flat electric wire 58 is supplied with the same current may be suppressed to the same level as that of a round electric wire, so the flat electric wire 58 is advantageous for suppressing a power loss.

On the other hand, as shown in FIG. 4, each flat electric wire 58 has a longitudinal direction L and a lateral direction S in the cross-sectional shape. The lateral direction S is perpendicular to the longitudinal direction L. Therefore, the flat electric wire 58 is hard to bend in the longitudinal direction L and easy to bend in the lateral direction S. Because the width of the flat electric wire 58 in the lateral direction S is smaller than the diameter of a round electric wire having an equivalent allowable current value, the flat electric wire 58 is easier to bend in the lateral direction S than a round electric wire, that is, the flat electric wire 58 may be bent in the form of a circular arc shape having a further smaller radius of curvature.

Note that each flat electric wire 58 has a substantially oblong cross-sectional shape or a substantially elliptical cross-sectional shape in the above description; however, the cross-sectional shape of each flat electric wire is not limited to these shapes. The cross-sectional shape may be, for example, another shape, such as a flattened rectangular shape. Alternatively, an electric wire not having a flattened cross-sectional shape but having a characteristic that is hard to bend in a predetermined direction and easy to bend in a direction different from the predetermined direction may be used.

Each of the terminals 49 coupled to the terminal ends of the flat electric wires 58 is made of a metal plate, and a copper plate is suitably used in view of electrical conductivity, cost, machinability, and the like. A proximal end portion 64 of each terminal 49 is coupled to copper wires 60 by a method, such as crimping. The copper wires 60 are exposed at the terminal end of the flat electric wire 58. In addition, each terminal 49 is a general one that is formed as a flat plate of which substantially the entire, other than a portion crimped to the copper wires 60, is extended in a narrow long shape so as to have a flat surface, and has the mounting hole 52 at its distal end portion.

When the above flat electric wires 58 and terminals 49 are used to form the electric cables 29, planes that respectively include the flat surfaces of the distal end portions of the terminals 49U, 49V and 49W protruding from the electric connector 40 are respectively arranged along the longitudinal directions L of the electric cables 29U, 29V and 29W of the respective phases, extending through the electric connector 40, as shown in FIG. 3. Therefore, in a state where the electric cables 29 are used for electrical connection between the inverter 26 and the motors 18 and 20 shown in FIG. 1, when the electric cables 29 of which the terminals 49 are connected to the output terminals 34 of the inverter 26 are bent in a substantially U-turn shape and connected to the motors 18 and 20, the bending direction substantially coincides with a direction in which the flat electric wires 58 that constitute the electric cables 29 are hard to bend (that is, the longitudinal direction L of the cross-sectional shape). Therefore, it is difficult to bend the electric cables 29 to form a circular arc shape having a small radius of curvature at a near location, and, when the flat electric wires 58 are bent in a U-turn shape while being twisted at about 90 degrees, the flat electric wires 58 are curved with a large radius of curvature and require a large wiring space.

Figure 5:
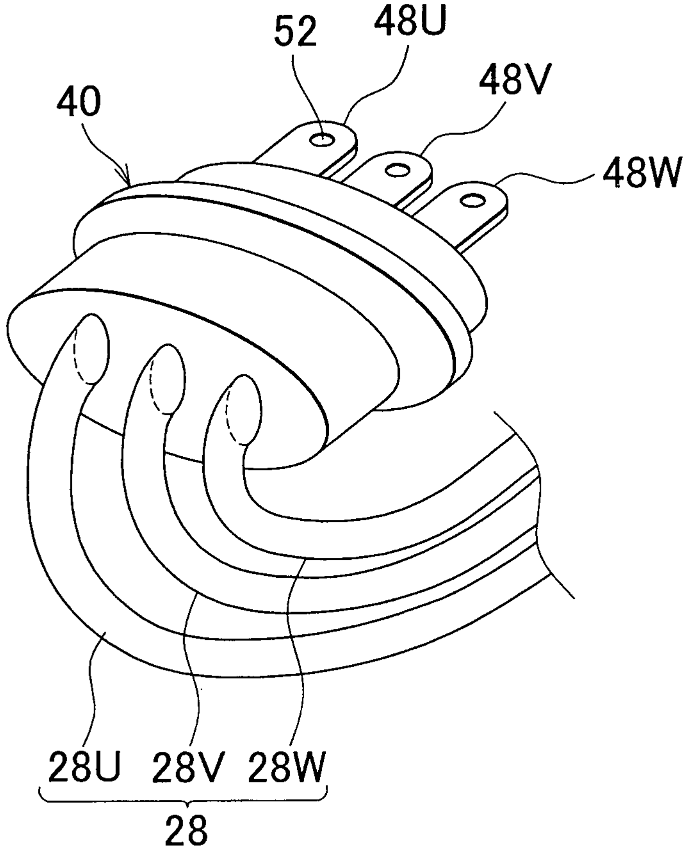
FIG. 5 is a perspective view of the electric connector according to the embodiment.
Figure 6:
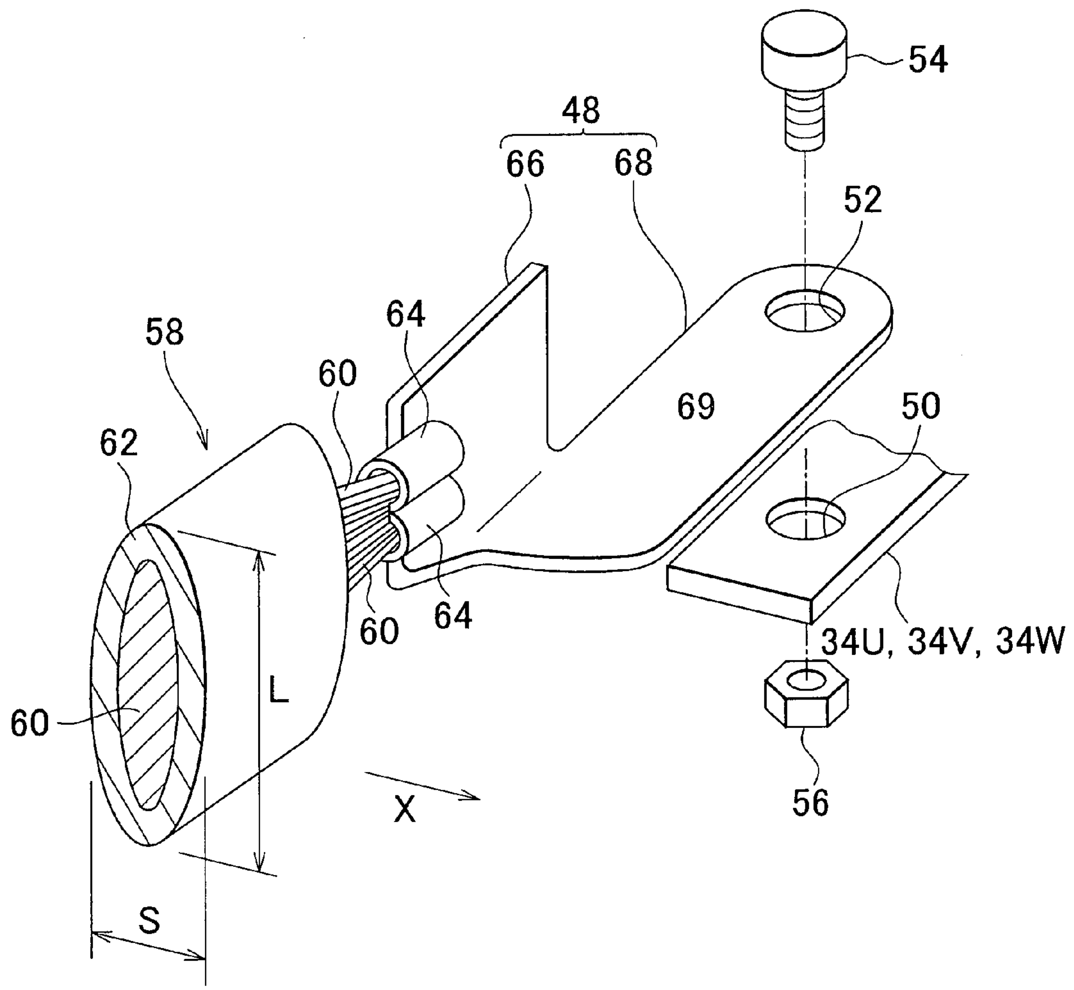
FIG. 6 is an enlarged view of one of sets of a flat electric wire and a terminal that are included in the electric connector shown in FIG. 5.

Then, as shown in FIG. 5 and FIG. 6, in the electric cables 28 according to the present embodiment, when the terminals 48 (the terminals 48U, 48V and 48W of the respective phases are collectively referred to by "48", and the same applies to the following description) are connected to the inverter 26, the planes that include the flat surfaces of connecting portions 68 of the terminals 48 are oriented in a direction in which the flat electric wires 58 are easy to bend and intersect with the predetermined direction.

Specifically, the electric cables 28 each include the flat electric wire 58 and the terminal 48. The terminal 48 is coupled to the terminal end of the flat electric wire 58 and is connected to the output terminal 34 of the inverter 26. The flat electric wires 58 are similar to those described above, so the description thereof is omitted here. On the other hand, each terminal 48 is, for example, formed of a metal plate, such as a copper plate, and has a wire connection portion 66 and the connecting portion 68. The wire connection portion 66 is coupled to the copper wires 60 exposed at the terminal end of the flat electric wire 58 by a method, such as crimping. The connecting portion 68 is, for example, connected to the terminal strip 34U of the output terminal 34 of the inverter 26 by fastening using the bolt 54 and the nut 56. Then, the connecting portion 68 is bent so as to form a right angle or a substantially right angle with respect to the wire connection portion 66 or the wire connection portion 66 is bent so as to form a right angle or a substantially right angle with respect to the connecting portion 68. By so doing, a flat surface 69 of the connecting portion 68 is oriented in the lateral direction S that is the direction in which the flat electric wire 58 is easy to bend. As a result, the easy bending direction of each of the electric cables 28 that are connected to the output terminals 34 of the inverter by the terminals 48 may be brought into coincidence or substantially coincidence with a bending direction in which the electric cables 28 need to be bent for a desired wiring direction, that is, the arrow X direction and the direction opposite to the arrow X direction here. Thus, the electric cables 28 of which the terminals 48 are connected to the inverter 26 may be bent in the form of a circular arc shape having a small radius of curvature at a location near the inverter 26, so it is possible to reduce wiring space.

Figure 7:
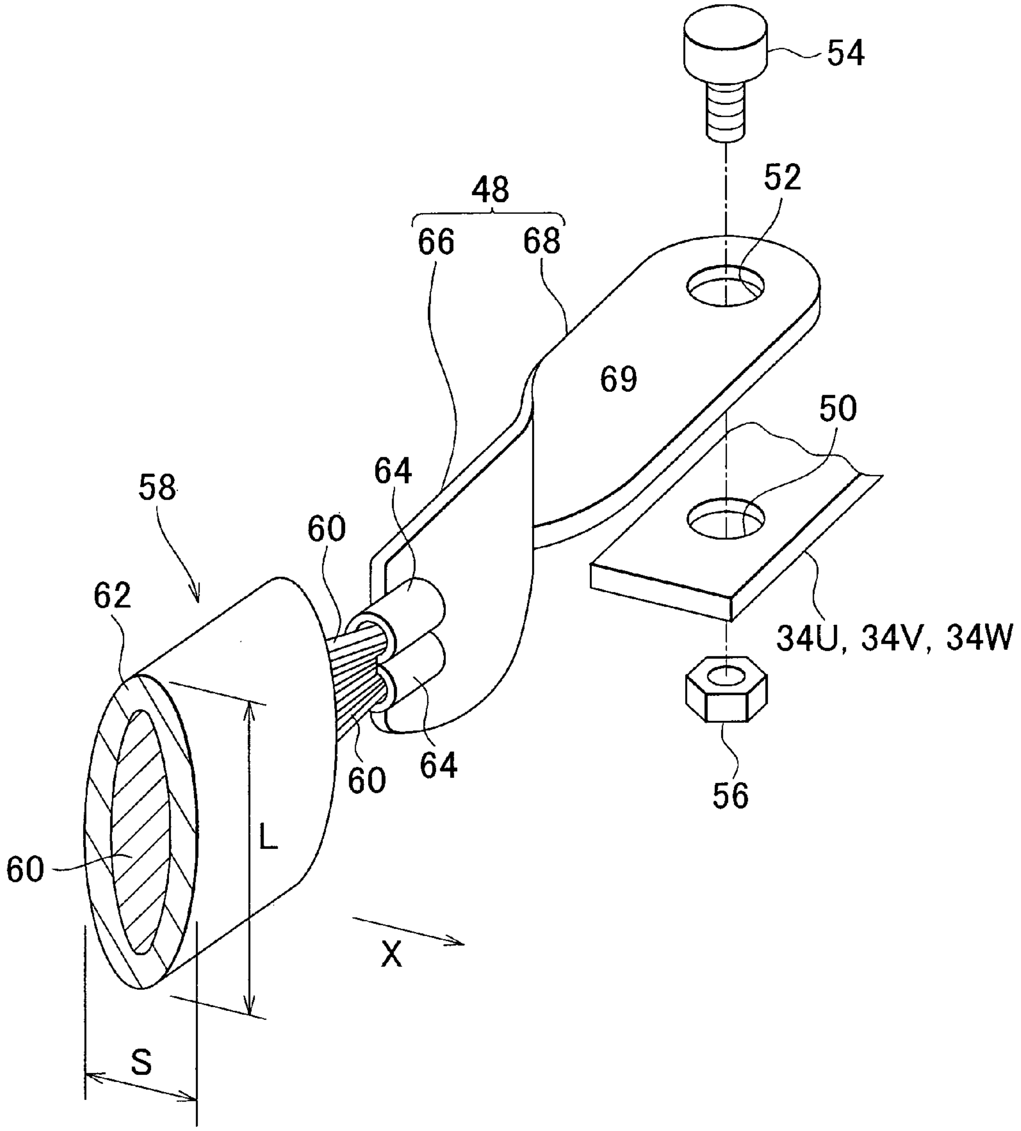
FIG. 7 is an enlarged view of one of sets of a flat electric wire and another terminal that are included in the electric connector shown in FIG. 5.

In addition, as shown in FIG. 7, in another terminal 48, the connecting portion 68 may be twisted and bent so as to form a right angle or a substantially right angle with respect to the wire connection portion 66, or the wire connection portion 66 may be twisted and bent so as to form a right angle or a substantially right angle with respect to the connecting portion 68. By so doing as well, as in the case of the above described embodiment, the easy bending direction of each of the electric cables 28 may be brought into coincidence or substantially coincidence with a bending direction in which the electric cables 28 need to be bent for a desired wiring direction.

Note that, in the above description, the terminals 48 of the electric cables 28 are coupled to the end portions of the flat electric wires 58, adjacent to the inverter 26; instead, the terminals 48 may also be coupled to the end portions of the flat electric wires 58 of the electric cables 28, adjacent to the motors 18 and 20. By so doing, it is possible to reduce wiring space also at the motor side, and, because the flat electric wires 58 are easier to bend than round electric wires, the flat electric wires 58 are advantageous for easily connecting the flat electric wires 58 to the input terminals of the motors 18 and 20.

In addition, in the above description, the wire connection portion 66 and connecting portion of each terminal 48 form an angle of about 90 degrees; however, the aspect of the invention is not limited to this configuration. The bending angle or twisting angle of each terminal 48 may be set so as to bring the easy bending direction of each flat electric wire 58 into coincidence or substantially coincidence with a bending direction in which the electric cables 28 need to be bent for a desired wiring direction.

Figure 8:
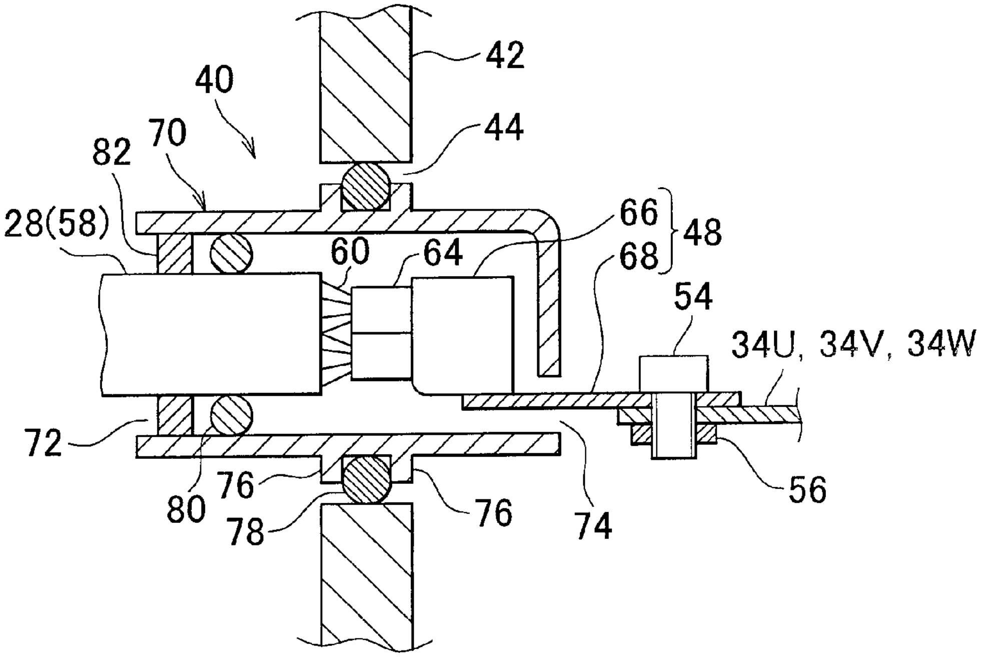
FIG. 8 is a cross-sectional view that shows a state where an electric connector according to an alternative embodiment to the embodiment, including the terminals shown in FIG. 6, is connected to the inverter.
Figure 9:
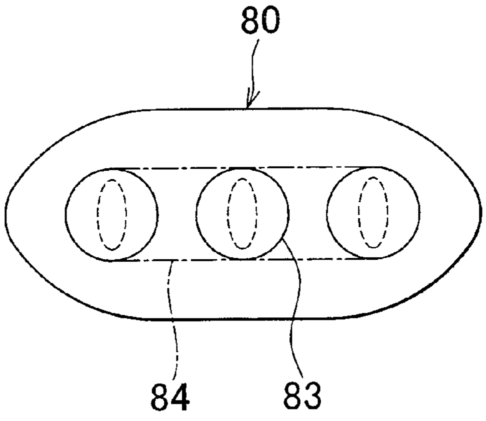
FIG. 9 is a front view of a retaining member that is assembled to the electric connector shown in FIG. 8.

Next, an electric connector 40 according to an alternative embodiment to the embodiment of the invention will be described with reference to FIG. 8 and FIG. 9. FIG. 8 is a cross-sectional view that shows a state where the electric connector 40 that includes the terminals 48 shown in FIG. 6 are connected to the inverter 26. FIG. 9 is a front view of a retaining member 82 that is assembled to the electric connector 40. The electric connector 40 may be provided not only at a connecting end portion adjacent to the inverter 26 but also at a connecting end portion adjacent to the motor 18 or 20.

The electric connector 40 includes the electric cables 28 and a connector housing 70. The electric cables 28 are formed of three flat electric wires 58 corresponding to three U, V and W phases and the terminals 48 are respectively coupled to at least one ends of the respective electric wires. The connector housing 70 accommodates the end portions of the electric cables 28, the wire connection portions 66 of the terminals 48 and parts of the connecting portions 68 of the terminals 48.

The connector housing 70 may be suitably formed of a plastic molded product having a cylindrical outer peripheral wall portion. An electric wire insertion opening 72 is formed at one end of the connector housing 70. A terminal opening 74 is formed at the other end of the connector housing 70 in order to allow the distal end portions of the connecting portions 68 of the terminals 48 to protrude outward of the housing.

In addition, two protruding strips 76 are formed on the outer peripheral surface of the connector housing 70 so as to be parallel to each other, and a seal member 78, such as an O-ring, is held between these protruding strips 76. When the electric connector 40 is inserted into the front side opening 44 of the inverter 26 and connected to the inverter 26, the seal member 78 is pressed against the peripheral portion of the front side opening 44 to be brought into close contact with the peripheral portion of the front side opening 44 to thereby prevent entry of water into the inverter case 42.

For example, a rubber seal member 80 is fitted around each of the end portions of the electric cables 28 located inside the connector housing 70. The seal member 80 may be an O-ring that is separately fitted to each of the flat electric wires 58 or may be a single planar or cylindrical member having three through-holes of which hole edge portions are able to be in close contact with the outer peripheries of the three flat electric wires 58 in a fluid-tight manner.

The retaining member 82 is fixed inside the connector housing 70. As shown in FIG. 9, the retaining member 82 may be formed of a plastic flat plate having a substantially elliptical outer shape, and has three circular through-holes 83 or a single oblong through-hole 84 through which the electric cables 28 with the terminals 48 are insertable. The retaining member 82 is fixed to the connector housing 70 by a method, such as adhesion and screwing. The retaining member 82 retains the vertical positions of the electric wires 58 in the electric wire insertion opening 72, and prevents the seal member 80 from being displaced along the electric wires 58 to slip out of the housing.

Subsequently, assembling of the thus configured electric connector 40 will be simply described.

First, the seal member 80 and the retaining member 82 are fitted around the three flat electric wires 58 to which the terminals 48 are respectively coupled. After that, the three flat electric wires 58 are inserted into the electric wire insertion opening 72 of the connector housing 70 initially from the terminals 48. Then, the distal end portions of the connecting portions 68 of the respective terminals 48 are allowed to protrude from the terminal opening 74 outward of the housing, and the seal member 80 is pressed into the connector housing 70. Finally, the retaining member 82 is fixedly fitted into the electric wire insertion opening 72. By so doing, assembling of the electric connector 40 is complete.

The electric connector 40 includes the electric cables 28 that respectively have the above described flat electric wires 58 and terminals 48, so, after the terminals 48 of the electric connector 40 each are connected to the output terminals 34 of the inverter 26, the flat electric wires 58 may be easily bent at a location immediately outside of the electric wire insertion opening 72 of the electric connector 40 with a small radius of curvature in a bending direction in which the electric cables 28 need to be bent for a desired wiring direction. Therefore, it is possible to reduce wiring space.

Figure 10A:
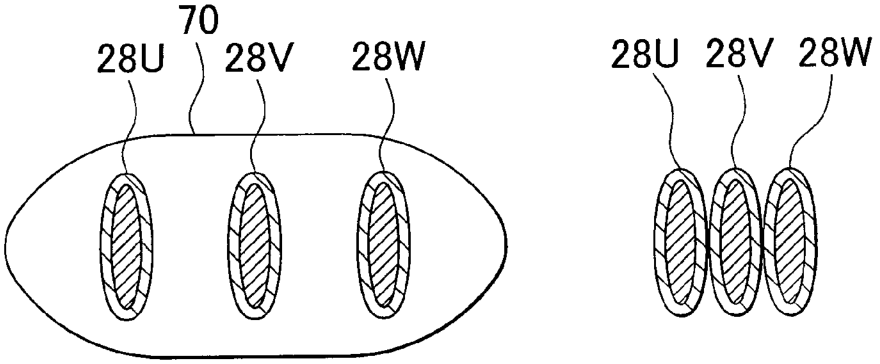
FIG. 10A is a view that shows the arrangement positions of three flat electric wires in the electric connector according to the embodiment and that shows the case where easy bending directions of the respective flat electric wires completely coincide with one another.

Here, as shown in FIG. 10A, in the electric connector 40, when the angle formed between the wire connection portion 66 and the connecting portion 68 is made equal among the terminals 48 of the electric cables 28U, 28V and 28W of the respective phases formed of the flat electric wires 58, the easy bending directions (horizontal directions in FIG. 10A) of the respective electric cables 28U, 28V and 28W completely coincide with one another. However, in this case, when the three electric cables 28U, 28V and 28W are arranged to bend in the same direction, there is a possibility that the three electric cables 28U, 28V and 28W overlap with one another in the lateral direction as shown in the right view of FIG. 10A and, as a result, the electric cable 28V placed in the middle is hard to dissipate heat.

In contrast to this, in the electric connector according to the present embodiment, the angle, at which a plane that includes the flat surface of the connecting portion of the terminal of at least one of a plurality of electric cables intersects with the longitudinal direction that is a direction in which the flat electric wire is hard to bend, may be varied from those of the other electric cables.

Figure 10B:
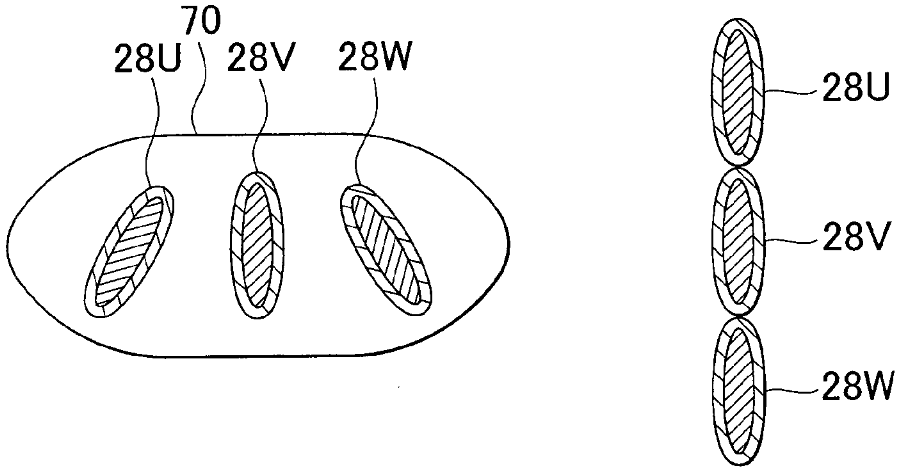
FIG. 10B is a view that shows the arrangement positions of the three flat electric wires in the electric connector according to the embodiment and that shows the case where easy bending directions of the respective flat electric wires substantially coincide with one another.

For example, as shown in FIG. 10B, when the easy bending directions of the respective electric cables 28U, 28V and 28W are shifted little by little, the three electric cables 28U, 28V and 28W may be successively arranged in the longitudinal direction when the electric cables 28U, 28V and 28W are, for example, arranged to bend rightward in FIG. 10B. Thus, it is possible to avoid a situation that the heat dissipation characteristic decreases as described above.

The orientations or positions of the respective electric cables 28U, 28V and 28W shown in FIG. 10B may be achieved in such a manner that the angle formed between the wire connection portion 66 and connecting portion 68 of the terminal 48 of the middle electric cable 28V is set at 90 degrees, the angle formed between the wire connection portion 66 and connecting portion 68 of the terminal 48 of the left side electric cable 28U is set so as to be slightly smaller than 90 degrees and the angle formed between the wire connection portion 66 and connecting portion 68 of the terminal 48 of the right side electric cable 28W is set so as to be slightly larger than 90 degrees.

Note that the electric cable and electric connector according to the aspect of the invention are not limited to the above described embodiments; they may be modified or improved in various forms.

For example, in the above description, the electric cable and the electric connector are connected to the inverter and the motor that serve as electrical apparatuses to pass alternating current; however, the aspect of the invention is not limited to this configuration. The electric cable and the electric connector may be used in an electrical connecting portion for passing direct current between other electrical apparatuses, such as between a battery and a converter and between a battery and an inverter.

In addition, in the above description, the electric cable and the electric connector are used for an FR hybrid vehicle; however, the aspect of the invention is not limited to this configuration. The electric cable and the electric connector may be applied to a front-engine front drive (FF) hybrid vehicle or may be applied to a single motor hybrid vehicle, an electric vehicle, or the like.

Furthermore, the electric cable and the electric connector according to the aspect of the invention may be applied not only to an automobile but also to a mobile unit of any other type having limited wiring space for size reduction (for example, robot) or an installed machine.

The invention claimed is:

1. An electric cable comprising:

an electric wire that is hard to bend in a predetermined direction and easy to bend in a direction different from the predetermined direction; and a terminal formed of a metal plate that is coupled to a terminal end of the electric wire and adapted to be connected to an electrical apparatus, the terminal comprising a wire connection portion coupled to the terminal end of the electric wire and a connecting portion adapted to be connected to the electrical apparatus, wherein the connecting portion is substantially perpendicular to the wire connecting portion, a flat surface of the connecting portion is substantially parallel to a plane in which the electric wire is easy to bend and intersecting with the predetermined direction, and wherein the connecting portion extends from the wire connection portion in a direction parallel to a longitudinal direction of the electric wire and the wire connection portion.

2. The electric cable according to claim 1, wherein the terminal is formed so that the connecting portion is bent with respect to the wire connection portion.

3. The electric cable according to claim 1, wherein the connection portion is formed in a plane perpendicular to a plane of the wire connection portion by rotating in a circular direction a distal end of the terminal so that the connecting portion is perpendicular with respect to the wire connection portion via a twisted portion.

4. The electric cable according to claim 1, wherein the electric wire is a flat electric wire that has a flattened cross-sectional shape having a longitudinal direction and a lateral direction perpendicular to the longitudinal direction.

5. The electric cable according to claim 1, wherein the terminal is formed so that the plane that includes the flat surface of the connecting portion is perpendicular to the predetermined direction in which the electric wire is hard to bend.

6. An electric connector comprising:

a plurality of the electric cables according to claim 1, provided side by side;

a connector housing that accommodates the wire connection portions of the terminals of the respective electric cables and parts of the connecting portions of the terminals of the respective electric cables and that allows distal end portions of the connecting portions of the terminals to protrude outward of the connector housing; and a seal member that is configured to be fitted around end portions of the electric wires before said electric wires are inserted inside the connector housing and that keeps the inside of the connector housing in a fluid-tight state.

7. The electric connector according to claim 6, wherein the electric connector includes three electric cables corresponding to a U, V and W phase, and the terminals of the electric cables are adapted to be respectively connected to output terminals of an inverter that serves as the electrical apparatus.

8. The electric connector according to claim 7, wherein an angle formed between the intersection of the flat surface of the connecting portion of the terminal of at least one of the three electric cables and the predetermined direction in which the electric wire is hard to bend varies between the other electric cables.

9. The electric connector according to claim 7, wherein an angle formed between the intersection of the flat surface of the connecting portion of the terminal of each of the three electric cables and the predetermined direction in which the electric wire is hard to bend varies among the three electric cables.

10. The electric cable according to claim 1, wherein the connecting portion extends from a lateral edge of the wire connection portion in a direction parallel to the longitudinal direction of the electric wire.

11. The electric cable according to claim 1, wherein the wire connecting portion is provided to a lateral edge of the connecting portion and is perpendicular to said connecting portion.

* * * * *